United States Patent [19]

Dupin et al.

[11] Patent Number: 4,544,534
[45] Date of Patent: Oct. 1, 1985

[54] CATALYTIC DESULFURIZATION PROCESS OF AN ACID GAS CONTAINING $H_2S$

[75] Inventors: Thierry Dupin, Garges Les Gonesse; Robert Voirin, Orthez, both of France

[73] Assignee: Societe Nationale Elf Aquitaine, Courbevoie, France

[21] Appl. No.: 537,385

[22] PCT Filed: Dec. 10, 1982

[86] PCT No.: PCT/FR82/00208
§ 371 Date: Aug. 16, 1983
§ 102(e) Date: Aug. 16, 1983

[87] PCT Pub. No.: WO83/02068
PCT Pub. Date: Jun. 23, 1983

[30] Foreign Application Priority Data

Dec. 17, 1981 [FR] France ............................... 81 23611

[51] Int. Cl.$^4$ ...................... B01D 53/36; C01B 17/04
[52] U.S. Cl. .................................... 423/230; 423/244; 423/573 R
[58] Field of Search ................... 423/230, 539, 244 A, 423/244 R, 573 R, 573.6, 574, 576

[56] References Cited

U.S. PATENT DOCUMENTS

| | | | |
|---|---|---|---|
| 4,310,497 | 1/1982 | Deschamps et al. | 423/539 X |
| 4,399,112 | 8/1983 | Voirin | 423/539 X |
| 4,422,958 | 12/1983 | Dupin | 502/217 |
| 4,427,576 | 1/1984 | Dupin | 502/217 X |

FOREIGN PATENT DOCUMENTS

| | | | |
|---|---|---|---|
| 2481145 | 4/1980 | France | 423/539 |
| 622324 | 4/1949 | United Kingdom | 423/573.6 |

*Primary Examiner*—Earl C. Thomas
*Attorney, Agent, or Firm*—Weiser & Stapler

[57] ABSTRACT

Catalytic desulfurization process of an acid gas containing $H_2S$, and optionally a total quantity of at most 3% by volume of $CS_2$ and/or COS, by contacting said acid gas and oxygen or air with a catalyst based on titanium oxide, at temperatures between 100° C. and 600° C. The catalyst used comprises, in addition to the titanium oxide, a sulfate of alkaline earth metal selected from Ca, Sr, Ba and Mg. Application to the desulfurization of acid gases, which in particular contain less than 15% by volume of $H_2S$, and therefore cannot be treated in conventional sulfur plants.

39 Claims, No Drawings

CATALYTIC DESULFURIZATION PROCESS OF AN ACID GAS CONTAINING H2S

The present invention relates to a process of catalytic desulfurization of an acid gas containing $H_2S$, and optionally also a total amount of at most 3% by volume of $CS_2$ and/or COS, with recovery of these sulfur compounds in the form of sulfur or optionally $SO_2$.

Various industrial operations give rise to acid gases which contain $H_2S$ in concentration of at most 15% by volume. The content of $H_2S$ in such gases is too small to be able to treat them in conventional sulfur plants which comprise as a first stage combustion of the acid gas in a burner. Indeed this combustion is technically feasible only with acid gases whose $H_2S$ content exceeds 15% by volume. To recover as sulfur the $H_2S$ contained in acid gases which contain less than 15% of $H_2S$ by volume, it has been proposed to subject them to a catalytic oxidation in the presence of oxygen or air, using various catalysts.

Thus, in United Kingdom Pat. No. 622,324, there is described a process in which the $H_2S$ contained in low concentration in an acid gas is oxidized into sulfur by passage of a mixture of the acid gas with a suitable quantity of oxygen or air in contact with a catalyst consisting of an oxide of titanium and particularly orthotitanic acid activated by heating, the contact being effectuated at temperatures between 100° C. and 400° C.

Although of interest, such a process has certain shortcomings. The process particularly calls for the use of an orthotitanic acid which is free of any soluble salt as the catalyst. To obtain such a pure product, several successive operations of neutralization and of washing are necessary which leads to an expensive catalyst. Moreover, the catalyst being constituted exclusively of orthotitanic acid, this results in a selectivity for sulfur which is insufficient for industrial exploitation, and it is necessary to carry out a pre-sulfurization of the catalyst to improve this selectivity, which constitutes an additional step raising the cost of the process.

It has now been discovered that the efficiency of the above-described process can be improved by using a particular catalyst comprising an oxide of titanium associated with an alkaline earth metal sulfate. Such a catalyst provides reliability and increased activity, which permits the oxidation of $H_2S$ with increased conversion yield and an excellent selectivity for sulfur which has long-term persistence.

The process of the invention for the catalytic desulfurization of an acid gas containing $H_2S$ and optionally also a total amount of at most 3% by volume of $CS_2$ and/or COS, with recovery of these sulfur compounds as sulfur and optionally as $SO_2$, is of the type in which said acid gas is contacted with a controlled quantity of a gas containing free oxygen, preferably as a mixture, with a catalyst based upon titanium oxide, at temperatures between 100° C. and 600° C., and is characterized in that the catalyst, in addition to the titanium oxide, comprises also an alkaline earth metal sulfate, selected from the group consisting of calcium, strontium, barium, and magnesium.

Among the catalysts comprising titanium oxide and an alkaline earth metal sulfate as stated above for use in the inventive process, a preferred catalyst comprises an oxide of titanium and calcium sulfate. Such a catalyst is mechanically exceptionally resistant.

The catalysts comprising titanium oxide and an alkaline earth metal sulfate defined above may contain also up to 30% by weight of a constituent selected from silica, alumina, clays, silicates, titanium sulfate and ceramic fibers.

Among the catalysts used in accordance with the invention, whether they be essentially constituted by titanium oxide and an alkaline earth metal sulfate, or whether they also contain an additional constituent as described above, the weight ratio of titanium oxide, relative to the total weight of the calcined catalyst and expressed as $TiO_2$, is preferably between about 60% and about 99%, and more preferably between 80%, and 99%, whereas the weight ratio of the alkaline earth metal sulfate, relative also to the total weight of the calcined catalyst, is preferably between 40% and 1%, and more preferably between 20% and 1%.

These catalysts can be prepared by any appropriate process by which there is obtained either a product in which the constituents of titanium oxide, alkaline earth metal sulfate and optional additional constituent, are mixed intimately, or also a product constituted of titanium oxide and of the optional additional constituent impregnated with the alkaline earth metal sulfate.

The preparation of the catalyst can be carried out, for instance, by impregnating a body based on titanium oxide and the optional additional constituent successively with a compound which contributes the sulfate anion, notably sulfuric acid or ammonium sulfate, or hydroxylamine sulfate, then with a compound which contributes the alkaline earth cation, notably acetate, nitrate or chloride of an alkaline earth metal, thereby forming the alkaline earth metal sulfate in the pores of the body based on titanium oxide, and drying and calcining the so impregnated product, the calcination being carried out at a temperature between 350° C. and 900° C., and preferably between 350° C. and 800° C. The body based on titanium oxide, and optionally on the additional constituent, can be obtained specifically as described in French patent application No. 8009126 (publication No. 2,481,145) of April 23, 1980, utilizing an amorphous and/or poorly crystallized titanium oxide as described in said patent application, or else by using any substance which can be converted into titanium oxide by calcination, such as, for example, the ortho- and meta-titanic acids and the oxyhdroxides of titanium. The impregnation of the body is carried out so that the weight ratio between $SO_4$ and $TiO_2$ is between about 0.01 and about 0.15 and preferably between 0.05 and 0.10, and so that the weight ratio between the alkaline earth metal and $TiO_2$ is between about 0.004 and about 0.20, and preferably between 0.02 and 0.15.

The catalyst of the invention can also be prepared starting from a mixture containing the titanium oxide, the optional additional constituent, and the alkaline earth metal sulfate, or a mixture of a compound which contributes the sulfate anion and of a compound which contributes the alkaline earth cation, and by subjecting this starting mixture to a treatment comprising the steps of mixing, shaping, drying and calcination analogous to the procedure described in the French patent application No. 8009126. In the starting mixture, the nature of the titanium oxide and of the compounds contributing respectively the anion sulfate and the alkaline earth metal cation, as well as the weight ratios between $SO_4$ and $TiO_2$ on the one hand, and the alkaline earth metal and $TiO_2$, on the other hand, correspond to those stated in the preceding preparation of the catalyst by impregnation of a body based on titanium oxide.

In a variant of this process, there is used a titanium oxide obtained from sulfuric reaction of ilmenite after hydrolysis, filtration and drying, and containing sulfate anions in the form, for example, of sulfuric acid, titanium sulfate, and/or basic salts of titanium, the starting material then comprising only that titanium oxide, the optional additional constituent, and the compound contributing the alkaline earth cation, the respective weight ratios between the $SO_4$ and $TiO_2$, and between the alkaline earth metal and $TiO_2$, being those defined above.

The titanium oxide obtained from the sulfuric reaction of ilmenite can also be used in the preparation of the catalyst by the impregnation method of a body based on oxide of titanium described above.

In that case, the body containing the oxide of titanium is impregnated only by a compound contributing the cation of the alkaline earth metal. One proceeds so that the weight ratios between $SO_4$ and $TiO_2$, on one hand, and the alkaline earth metal and $TiO_2$, on the other hand, have the values stated above.

Another method of preparing the catalyst used in accordance with the invention consists in sulfating a body based on an oxide of titanium, and the optional constituent, and containing the alkaline earth cation. This sulfation is carried out at a temperature between 250° C. and 550° C. by a gas comprising preferably a mixture of $SO_2$ and air, the weight ratios of $SO_4:TiO_2$ and alkaline earth metal: $TiO_2$ being those given above. The sulfated product is optionally subjected to drying and then calcined at a temperature between 300° C. and 900° C., and preferably between 350° C. and 800° C.

The catalysts used in accordance with the invention have specific surfaces, by the nitrogen absorption method, called the BET method, between 5 and 300 $m^2/g$ and preferably between 10 and 240 $m^2/g$, and total porous volumes, determined by the mercury penetration method, between 0.05 and 0.6 $cm^3/g$ and preferably located between 0.1 and 0.4 $cm^3/g$. Their resistance to attrition is below 2%.

The resistance to attrition represents the quantity of dust, expressed in grams, produced by 100 grams of catalyst granules placed on a #24 screen 20 centimeters in diameter of the series AFNOR × 11-501 and vibrated for 10 minutes with a FENWICK REX vibrator. The resistance to attrition is expressed in percent.

The acid gas treated in accordance with the invention, i.e. the gas containing $H_2S$, and optionally a total concentration of at most 3% by volume of $CS_2$ and/or COS, can have a concentration of $H_2S$ varying within wide limits. The invention can be applied advantageously to the treatment of an acid gas containing $H_2S$ in concentration of at most 15% by volume, and optionally a total quantity of $CS_2$ and/or COS of at most 3%, and preferably at most 1% by volume, the acid gas comprising particularly 0.01 to 12% by volume of $H_2S$ and optionally a total concentration of $CS_2$ and/or COS of at most 1% by volume. The acid gas which is subjected to the treatment in accordance with the invention can be of various origins. In particular such an acid gas can be a natural gas, a gas obtained from the gasification of coal or of heavy oils, or a gas obtained by hydrogenation of sulfur compounds in the effluent of a sulfur plant.

The gas containing the free oxygen used for the oxidation of the $H_2S$ and the conversion of the optional $CS_2$ and COS constituents in the acid gas is generally air, although it is possible to use pure oxygen, air enriched in oxygen, or mixtures of oxygen and inert gas other than nitrogen in various proportions.

The acid gas and the gas containing the free oxygen can be fed separately to contact the catalyst. However, in order to obtain a highly homogeneous gaseous reaction medium, it is preferable to premix the acid gas with the gas containing free oxygen and then to feed this mixture to contact the catalyst.

The duration of contact of the gaseous reaction medium with the catalyst in each desulfurization zone used can vary from 0.5 to 10 seconds and is particularly between 1 and 6 seconds, these values being defined under standard conditions of pressure and temperature.

As explained above, the catalytic desulfurization according to the invention can be effectuated at temperatures between 100° C. and 600° C., said temperatures being preferably between 180° and 500° C.

In one embodiment of the process of the invention, which is applicable to the desulfurization of an acid gas having a potential content of $H_2S$ (content of free $H_2S$ + content of $H_2S$ theoretically available from any $CS_2$ and COS constituents that may be present) at most equal to 5% by volume, said process consists of bringing the acid gas and the gas containing the free oxygen preferably in pre-mixed form, in such quantities that the molar ratio of oxygen to potential $H_2S$ is in the range from 0.35 to 1.8, into contact with the catalyst comprising titanium oxide and an alkaline earth metal sulfate of the type defined above, said catalyst being positioned in a single reaction zone operating at temperatures between 180° C. and 500° C., with a contact duration between gaseous reaction medium and the catalyst between 1 and 6 seconds.

When the gas containing the free oxygen and the acid gas are in a molar ratio R of oxygen to potential $H_2S$ which is between 0.35 and 0.6 and when the inlet temperatures of these gases into the catalytic reaction zone are between 180° and 350° C., then 70 to 98% of the potential $H_2S$ is converted into sulfur and $SO_2$ with a selectivity for sulfur above 90%. For values of R from 0.35 to 0.5, and more particularly equal to about 0.4, and inlet temperatures of the gases into the catalytic zone from 200° to 250° C., the selectivity for sulfur is above 98%.

When said ratio R reaches the value 1.8, the sulfur compounds present in the acid gas are converted entirely into $SO_2$.

For values of the ratio R between 0.6 and 1.8, the potential $H_2S$ contained in the acid gas is recovered as a mixture of sulfur and $SO_2$ with a conversion of $H_2S$ above 90%, the selectivity for $SO_2$ increasing from 40% to 100% when the ratio R assumes values from 1 to 1.8. If necessary, the effluent of the catalytic reaction zone can be subjected to a supplemental purification treatment after separation of any sulfur which it may contain.

Another embodiment of the process according to the invention, which is applicable to the desulfurization of an acid gas having a potential $H_2S$ content above about 5% by volume, consists of passing the acid gas into a plurality of catalytic zones connected in series, comprising a first and a last catalytic zone which may be separated by one or more intermediate catalytic zones, each of said catalytic zones containing a catalyst comprising titanium oxide and an alkaline earth metal sulfate of the type defined above, also injecting into each of said zones, preferably in mixture with the acid gas, a volume of gas containing free oxygen such that the proportion of oxygen fed into each one of the first and intermediate catalytic zones is from 0.7 to 1.2 times, and preferably 0.8 to about 1 times that volume which is theoretically necessary to convert into sulfur a potential quantity of $H_2S$ representing 3 to 5% by volume of the acid gas, adjusting the temperatures of the gases fed into each one of the catalytic zones to values from 180° to 300° C. and preferably from 200° to 250° C., maintaining in each zone a contact duration between the reactive gases and the catalyst of between about 1 and 6 seconds, treating the gaseous effluent gas from each first and intermediate catalytic zone to separate by condensation the sulfur which it contains and directing said effluent freed of the sulfur to the inlet of the next zone, adjusting the molar ratio of $O_2$ to potential $H_2S$ at the inlet to the last catalytic zone to a value of 0.35 to 1.8 and if need be, subjecting the effluent from this zone to a treatment for separating by condensation the sulfur which it might contain, the number of intermediate catalytic zones being such that at the inlet to the last catalytic zone, the acid gas contains at most 5% by volume of potential $H_2S$.

If need be, the effluent from the last catalytic zone may be subjected to a supplemental purification treatment after separation of the sulfur which it may contain, this treatment depending on the nature of the gaseous sulfur compounds remaining in the effluent.

By adjusting the value of the ratio R of the oxygen to the potential $H_2S$ at the inlet to the last catalytic zone, the effluent from that zone can, after separation of the sulfur which it may contain, contain $H_2S$ (when R ranges from 0.3 to 0.5) or $SO_2$ (R equals 1.7–1.8) as the only sulfur compound, or else $H_2S$ and $SO_2$ in variable proportions (for intermediate values of R).

In the first and intermediate catalytic zones, the selectivity of the oxidation of $H_2S$ into sulfur is above 90% and even exceeds 98% under the above-mentioned preferred conditions for the proportion of oxygen (when R ranges from 0.35 to 0.5) and the temperature of the gas at the inlet of each of said zones.

The supplemental purification treatment which may be used in each one of the two embodiments of the process of the invention described above, depends upon the nature of the one or more sulfur compounds present in the effluent gas exiting from the single catalytic zone or from the last catalytic zone.

When the effluent contains only $H_2S$ as the gaseous sulfur compound, one can use a process which calls for a scrubbing of the gas with a regeneratable amine solution, for instance, methyldiethanolamine, or carry out an incineration of the effluent if its $H_2S$ content is not too high. For an effluent which contains $SO_2$ as the sole gaseous sulfur compound in such proportion as justifies recovery, one can use an adsorption process on an alkaline alumina or manganese oxide. When the effluent contains both $H_2S$ and $SO_2$, one may, by varying the ratio R, adjust the molar ratio of $H_2$ to $SO_2$ of this effluent to a value of about 2 to 1 and use as supplemental purification treatment a regeneration process using the reaction between $H_2S$ and $SO_2$ achieved at temperatures between 80° C. and 160° C. upon contact with a conventional CLAUS catalyst such as alumina or titanium oxide, or, if the total content of $H_2S$ and $SO_2$ in the effluent is too low, subjecting the effluent directly to incineration.

In the case of desulfurization of an acid gas carrying a potential $H_2S$ content above about 5% by volume, for which the effluent from the last catalytic zone contains $H_2S$ and $SO_2$ in a molar ratio of $H_2S$ to $SO_2$ of about 2 to 1 and is subjected to s supplemental purification treatment consisting of a regeneration process using the formation of sulfur by reaction between $H_2S$ and $SO_2$ obtained at temperatures between 80° C. and 160° C. in contact with conventional CLAUS catalyst containing alumina, it is preferable, in order to avoid that oxygen possibly reaches and contacts the CLAUS catalyst which could lead to sulfation of this catalyst, that at least the final ⅛ and preferably one-half and more preferably all of the catalyst used in the last catalytic oxidation zone consists of a catalyst formed by a support containing a major proportion by weight of alumina and preferably solely of alumina, on which there is deposited at least one compound of the metal selected from Fe, Co, Ni, Cu and Zn and particularly iron sulfate, said support advantageously having a specific surface between 30 and 300 $m^2/g$ and preferably between 50 and 120 $m^2/g$, whereas said catalyst comprises a quantity of metal in the range of 0.5 to 10%, and preferably from 2 to 6% by weight of the calcined catalyst.

In accordance with this embodiment, the process of the invention for the desulfurization of an acid gas having a potential $H_2S$ content above 5% by volume consists of:

passing said acid gas through a plurality of catalytic zones in series, comprising a first and a last catalytic zone, optionally separated by one or more intermediate catalytic zones, each of said first and intermediate catalytic zones containing a catalyst which comprises titanium oxide and a sulfate of an alkaline earth metal of the type previously defined, while at least the final ⅛, preferably one-half, and more preferably all of the catalyst used in the last catalytic zone consists of a catalyst formed of a support containing a major proportion by weight of alumina and preferably consisting solely of alumina on which there is deposited at least one compound of a metal selected from Fe, Co, Ni, Cu, and Zn, in particular, iron sulfate, said support having advantageously a specific surface between 30 and 300 $m^2/g$ and preferably between 50 and 120 $m^2/g$ and said catalyst containing a quantity of metal compound which corresponds to a total quantity of metal in the range from 0.5 to 10%, and preferably 2 to 6% by weight of calcined catalyst, the possible balance of the catalyst in the last catalytic zone consisting of catalyst based on titanium oxide and alkaline earth metal sulfate, also feeding into each one of said catalytic zones, preferably in mixture with the acid gas, a quantity of gas containing free oxygen such that the proportion of oxygen fed into each one of the first and intermediate catalytic zones represents 0.7 to 1.2 times, and preferably 0.8 to about 1 times that proportion which is theoretically necessary to convert into sulfur a potential quantity of $H_2S$ representing from 3 to 5% by volume of the acid gas, adjusting the temperatures of the gases fed into each one of the catalytic zones to a temperature of from 180° C. to 350° C. and preferably from 200° to 250° C., maintaining in each zone a contact duration between the reaction gases and the catalyst of between 1 and 6 seconds, treating the effluent gas exiting from each of the first and intermediate catalytic zones by condensation to separate the sulfur which it contains, and directing the said effluent freed of sulfur to the inlet of the next catalytic zone, adjusting the molar ratio of $O_2$ to potential $H_2S$ at the inlet of the last catalytic zone to obtain an effluent containing $H_2S$ and $SO_2$ in a molar ratio of $H_2S$ to $SO_2$ equal to about 2 to 1, and subjecting the gaseous effluent from the last catalytic zone after removal of the sulfur which it contains to a regenerative purification process using the formation of sulfur from the reaction of $H_2S$ and $SO_2$ in contact with a conventional CLAUS catalyst based on alumina at temperatures between 80° and 160° C., said catalyst, when saturated with sulfur, being regenerated by a gas free of free oxygen at a temperature between 200° and 400° C.

The invention is illustrated by the following examples given in non-limiting manner.

EXAMPLE 1

There was carried out the catalytic desulfurization of an acid gas having the following composition by volume:

| | |
|---|---|
| $H_2S$ | 2% |
| $H_2O$ | 7% |
| $CO_2$ | 91% |

To this end, a fixed bed catalytic reactor containing 1.1 m³ of catalyst was used, the reactor being provided on the one hand with a supply conduit for the gases which has a tap for the injection of the gas containing free oxygen, and on which there was mounted an indirect heat exchanger serving as a heater, between the tap and the inlet of the reactor and, on the other hand, a gas exit conduit extending the outlet from the reactor and on which there was mounted a steam cooled sulfur condenser. The passage of the gases from the inlet to the outlet of the reactor took place through the catalytic bed.

The catalyst used consisted of a product made from titanium oxide and calcium sulfate, which had the following characteristics:

| | |
|---|---|
| $TiO_2$ content by weight | 89.8% |
| $CaSO_4$ content by weight | 10.2% |
| Specific surface | 146 m²/g |
| Total porous volume | 0.35 cm³/g |
| Attrition resistance | 0.4% |

This catalyst was prepared as described below:

To a suspension of titanium oxide, obtained after hydrolysis and filtration through the conventional process of sulfuric reaction on ilmenite, containing sulfate anions in such quantity that the weight ratio of $SO_4$ to $TiO_2$ was equal to 0.08, there was added calcium nitrate so as to react all the sulfates, the weight ratio of calcium to $TiO_2$ being then equal to 0.033. The suspension was then dried at 150° C. for one hour.

The powder obtained was mixed for two hours in the presence of water in weight proportions corresponding to 64 parts of powder to 36 parts of water. The resulting mixture was then extruded through an orifice of 4 mm diameter, and the extrudates were then dried at 110° C. for four hours and then calcined at 400° C. for two hours.

The catalytic desulfurization of the acid gas described above was carried out as follows:

The acid gas, introduced by the gas inlet conduit at a rate of 1,000 Nm³/h and at a temperature of 40° C., received through the tap additional air corresponding to a flow rate of 40 Nm³/h, this air was injected at ambient temperature. The mixture of acid gas and air, in which the molar ratio of oxygen to $H_2S$ was 0.4, was raised to a temperature of 200° C. by passage through the heater, then injected into the reactor at that temperature. The contact time between this mixture and the catalyst contained in the reactor was 4 seconds, which corresponds to a VVH of 900 h⁻¹. The gaseous effluent exiting from the reactor through the outlet conduit no longer contained free oxygen and was at a temperature of 273° C. This effluent was cooled to 170° C. in the condenser to separate from it the sulfur which it contained. The gases exiting from the condenser contained $H_2S$ as the sole sulfur compound, in a concentration equal to 0.4% by volume.

There was thus obtained a conversion of the $H_2S$ equal to 80.5% with a selectivity for sulfur of 100%.

For comparison, this experiment was repeated under similar conditions but using a catalyst based on titanium oxide not containing calcium prepared as described above but omitting the addition of calcium salt to the suspension of titanium oxide.

A conversion of $H_2S$ equal to 35% was obtained with a selectivity for sulfur equal to 95%.

EXAMPLE 2

There was carried out the catalytic desulfurization of an acid gas having the following composition by volume:

| | |
|---|---|
| $H_2S$ | 9% |
| $H_2O$ | 7% |
| $CO_2$ | 84% |

The operation was carried out in an installation composed of three reactors in series, namely a first reactor, an intermediate reactor, and a last reactor, each containing 1.1 m³ of the catalyst used in example 1. These reactors were similar to the one defined in said example 1 and each one therefore comprised on the one hand a gas inlet provided with a tap for injection of the gas containing free oxygen and a heater positioned between this tap and the inlet of the reactor, and on the other hand a conduit for the exit of the gases extending the outlet of the reactor and on which there was mounted a steam cooled sulfur condenser. The outlet for the gases of the sulfur condenser associated with one of the first and intermediate reactors was connected to the inlet conduit of the gases provided on the next reactor in the series, upstream from the tap on the respective conduit.

The catalytic desulfurization of the gas described at the start of this example was carried out as follows The acid gas, introduced through the inlet gas conduit of the first reactor at a rate of 1,000 Nm³/h and at a temperature of 40° C. received, through the tap on said conduit, air injected at ambient temperature at a rate of 75 Nm³/h. This quantity of air corresponds to the theoretical quantity necessary for oxidizing into sulfur a quantity of $H_2S$ of the acid gas equal to 3% by volume. The mixture of acid gas and air in which the molar ratio of $O_2$ to $H_2S$ was equal to 0.17, was raised to a temperature of 200° C. by passing through the heater connected to the first reactor and then was injected into said reactor at this temperature. The contact time of said mixture with the catalyst contained in the first reactor was equal to 4 seconds, which corresponds to a VVH of 900 $h^{-1}$. The gaseous effluent exiting from the first reactor by the outlet of said reactor no longer contained free oxygen and was at a temperature of 333° C. This effluent was cooled to 175° C. in the condenser associated with the first reactor in order to separate the sulfur which it contained. The gases exiting said condenser, which were at a temperature of 175° C. and had an $H_2S$ content equal to 5.6% by volume, had added to them 75 $Nm^3/h$ of air added at ambient temperature, by the tap provided on the gas inlet conduit of the intermediate reactor. This new quantity of air corresponds again to the theoretical quantity necessary for oxidizing into sulfur a quantity of $H_2S$ corresponding to 3% by volume of the gas. The gas mixture obtained, in which the molar ratio of $O_2$ to $H_2S$ was 0.27, was then reheated to 200° C. by passing through the heater associated with the intermediate reactor, before being injected at that temperature into the intermediate reactor. The contact time of this mixture with the catalyst in the intermediate reactor was again 4 seconds (VVH equal to 900 $h^{-1}$). The gaseous effluent exiting the intermediate reactor through the gas outlet from this reactor no longer contained free oxygen and was at a temperature of 335° C. and a $H_2S$ content of 2.40% by volume.

This effluent gas was cooled to 175° C. in the condenser connected to the intermediate reactor so as to separate the sulfur which it contains. To the gases exiting this condenser there were added, by the tap on the gas inlet conduit to the last reactor, a quantity of air at ambient temperature and such that the molar ratio of $O_2$ to $H_2S$ in the gaseous mixture so obtained had a value of 0.4. This gaseous mixture was raised to a temperature of 200° C. by passing it through the heater associated with the last reactor and then injected at this temperature into that reactor.

The contact time of this mixture with the catalyst contained in the final reactor was 4 seconds (VVH equal to 900 $h^{-1}$). The gaseous effluent coming from the last reactor no longer contained free oxygen and was at a temperature of 295° C. This gaseous effluent was cooled to 175° C. in the condenser associated with the last reactor to separate the sulfur which it contained. At the outlet of this condenser, there was obtained a gas containing $H_2S$ as its only sulfur compound in concentration equal only to 0.46% by volume.

The overall conversion of $H_2S$ was 94%, this converted $H_2S$ being completely recovered as sulfur (selectivity for sulfur equal to 100%).

EXAMPLE 3

There was carried out the catalytic desulfurization of an acid gas having the composition by volume given below:

| | |
|---|---|
| $H_2S$ | 1.2% |
| COS | 0.5% |
| $CS_2$ | 0.15% |
| $H_2O$ | 7% |
| $CO_2$ | 91.15% |

There was used an apparatus similar to that described in example 1 and containing the same volume of catalyst.

The catalyst used was made of titanium oxide and barium sulfate and had the following characteristics:

| | |
|---|---|
| $TiO_2$ content by weight | 84% |
| $BaSO_4$ content by weight | 16% |
| Specific surface | 107 $m^2/g$ |
| Total porous volume | 0.32 $cm^3/g$ |
| Attrition resistance | 0.2% |

This catalyst was prepared following the procedure described below:

A suspension of titanium oxide, after hydrolysis and filtration by the conventional process of sulfuric reaction on ilmenite was dried at 180° C. for one hour, the weight ratio of $SO_4$ to $TiO_2$ being 0.08.

The powder obtained was mixed for 2.5 hours in the presence of water and barium nitrate, using, stated in percent of total weight of the three constituents, 64% of titanium oxide powder, 8% of barium nitrate and 28% water. The weight ratio of Ba to $TiO_2$ was then equal to 0.113. The resulting mixture was extruded through a nozzle of 5 mm diameter and the extrudates formed were dried at 110° C. for 4 hours and then calcined at 500° C. for one hour.

The catalytic desulfurization of the acid gas described in this example was carried out as follows:

The acid gas introduced by the gas inlet at a rate of 1,000 $Nm^3/h$ and at a temperature of 35° C., received, through the tap provided on this conduit, an addition of air injected at ambient temperature at a rate of 50 $Nm^3/h$. The mixture of acid gas and air, whose molar ratio of $O_2$ to (potential $H_2S$) was 0.5, was raised to a temperature of 200° C. by passage through the heater and then introduced at that temperature into the reactor. The contact time of this mixture with the catalyst contained in the reactor was equal to 4 seconds (VVH equal to 900 $h^{-1}$). The gaseous effluent exiting from the reactor through the outlet conduit for gases no longer contained free oxygen and its temperature was 298° C. This effluent was cooled to 170° C. in the condenser to separate the sulfur which it contained. The gases exiting from the condenser contained more than 0.21% by volume of potential $H_2S$.

There was obtained a conversion of potential $H_2S$ equal to 89% with a selectivity for sulfur of 99%.

For comparison, this experiment was repeated under similar conditions with a catalyst based on titanium oxide not containing barium prepared as explained above but without adding the barium salt in mixing the titanium oxide powder with water. In that experiment, there was obtained a conversion of the potential $H_2S$ equal only to 28% with a selectivity for sulfur equal to 94%.

EXAMPLE 4

There was carried out the catalytic desulfurization of an acid gas having a composition indentical to that of the acid gas of example 1 by directing the conversion of $H_2S$ so as to form only $SO_2$.

The equipment and the catalyst were identical to those defined in example 1.

The desulfurization was carried out as follows:

The acid gas, introduced through the gas inlet conduit at a rate of 1,000 $Nm^3/h$ and at a temperature of 40°

C., received through the tap provided on that conduit, an addition of air at ambient temperatures at a rate of 170 Nm$^3$/h. This mixture of acid gas and air, in which the molar ratio of $O_2$ to $H_2S$ was equal to 1.7, was raised to a temperature of 200° C. by passage through the heater, and then introduced at that temperature into the reactor. The contact time of this mixture with the catalyst was 4 seconds (VVH equal to 900 h$^-$). The gaseous effluent exited from the reactor at a temperature of 484° C. This effluent was cooled to 170° C. in the condenser, the gases exiting from the condenser containing $SO_2$ as the only sulfur compound.

There was obtained a conversion of $H_2S$ equal to 100% with a selectivity of 100% for $SO_2$.

For comparison, this experiment was repeated under similar conditions using the comparison catalyst used in the comparison test of example 1.

There was converted only 79% of $H_2S$ under these conditions, the selectivity for $SO_2$ being 100%.

EXAMPLE 5

There was carried out the catalytic desulfurization of an acid gas having the following composition by volume:

| | |
|---|---|
| $H_2S$ | 9% |
| $H_2O$ | 7% |
| $CO_2$ | 84% |

There was used an installation comprising three catalytic oxidation reactors connected in series, namely, a first reactor, an intermediate reactor, and a last reactor, this series of reactors being followed by a supplemental purification system comprising two catalytic converters connected in parallel. The catalytic reactors were analogous to that used in example 1, therefore each comprised an inlet and an outlet separated by a catalytic bed, a gas supply conduit connected to the inlet of the reactor, this conduit being provided with a tap for the injection of the gas containing the free oxygen and a heater positioned between this tap and the inlet of the reactor and a gas outlet conduit extending the outlet of the reactor and on which there was mounted a steam cooled sulfur condenser. The outlet for the gases from the sulfur condenser associated with each one of the first and intermediate catalytic reactors was connected to the gas inlet conduit equipping the next catalytic reactor in the series, upstream of the tap provided on the respective conduit. The first and intermediate catalytic reactors each contained 1.1 m$^3$ of the catalyst used in example 1, whereas the last catalytic reactor contained 1.1 m$^3$ of a catalyst consisting of spheres of 4 to 6 mm in diameter, of an alumina having a specific surface equal to 100 m$^2$/g impregnated with iron sulfate and having an iron content equal to 4% by weight.

Each of the two catalytic converters of the supplemental purification system contained a catalytic bed consisting of 2.5 m$^3$ of spheres, of 4 to 6 mm in diameter, of alumina having a specific surface equal to 100 m$^2$/g and was provided with an inlet and an exit for the gas undergoing treatment and, on the other hand, with an inlet and outlet for a regenerating gas, the inlets of the converters being separated from the corresponding outlets by the catalytic bed. The inlets for the gas being treated which are provided on the converters are connected through gates to a supply conduit for the gas being treated, which was connected to the outlet of the sulfurcondenser associated with the last catalytic reactor, and constituted the inlet conduit to the supplemental purification system, whereas the outlets for the gases being treated provided on these converters were connected through gates to an evacuation conduit for the gases being treated constituting the outlet conduit of the supplemental purification system. The outlets for the regenerating gas provided on the converters were connected through gates to the inlet of a regenerating gas circuit, comprising in series in the circuit from said outlets, a steam cooled sulfur condenser, a blower, and a heater, the outlet of the heater being connected, through gates, to the inlets for the regenerating gas provided on the converters. The gates mounted at the inlets and outlets of the converters were opened and closed cyclically so as to have one of the converters traversed by the gas exited from the sulfur condenser associated with the catalytic reactor, whereas the other converter was traversed by the warm regenerating gas coming from the heater and circulating toward the sulfur condenser of the regenerating circuit.

The catalytic desulfurization of the acid gas defined at the beginning of this example was carried out as described below:

The acid gas, introduced through the gas inlet conduit of the first catalytic reactor at a rate of 1,000 Nm$^3$/h and at a temperature of 40° C., received through the tap on said conduit added air injected at ambient temperature at a rate of 75 Nm$^3$/h. This volume of air corresponds to the theoretical quantity necessary to oxidize into sulfur a quantity of $H_2S$ in the acid gas equal to 3% by volume. The mixture of acid gas and air, in which the molar ratio of $O_2$ to $H_2S$ was equal to 0.17, was raised to a temperature of 200° C. by passage through the heater associated with the first catalytic reactor, then injected into said reactor at this temperature. The contact time of this mixture with the catalyst contained in the first reactor was 4 seconds, which corresponds to a VVH of 900 h$^{-1}$. The gaseous effluent coming from the first catalytic reactor through the outlet conduit of this reactor no longer contained free oxygen and was at a temperature of 333° C. This effluent was cooled to 175° C. in the condenser associated with the first catalytic reactor to separate the sulfur which it contained. To the gases coming from said condenser, which were at a temperature of 175° C., and a content of $H_2S$ equal to 5.6% by volume, there was added 75 Nm$^3$/h of air at ambient temperature through the tap provided on the inlet conduit for gases for the intermediate catalytic reactor. This new quantity of air corresponds again to the theoretical quantity necessary to oxidize into sulfur a quantity of $H_2S$ corresponding to 3% by volume of the gas. The gaseous mixture obtained, in which the molar ratio of $O_2$ to $H_2S$ was equal to 0.27, was heated to 200° C. by passage through the heater associated with the intermediate catalytic reactor, before being injected at this temperature into said intermediate reactor. The contact time of this mixture with the catalyst present in the intermediate catalytic reactor was also 4 seconds (VVH equal to 900 h$^{-1}$). The gaseous effluent exiting from the intermediate catalytic reactor through the gas evacuation conduit of this reactor no longer contained free oxygen and had a temperature equal to 335° C. and an $H_2S$ content of 2.40% by volume. This effluent was cooled to 175° C. in the condenser associated with the intermediate catalytic reactor so as to separate the sulfur which it contains. To the gases exiting from said condenser there was added, through the tap on the gas inlet of the last catalytic reactor, a quantity of air added at ambient temperature and such that the molar ratio of $O_2$ to $H_2S$ in the gaseous mixture so obtained had a value equal to 0.5. This gaseous mixture was raised to a temperature of 200° C., by passage through the heater associated with the last catalytic reactor and then injected, at this temperature, into said reactor. The contact time of said gaseous mixture with the alumina-based catalyst contained in the last catalytic reactor was 4 seconds (VVH equal to 900 $h^{-1}$). The gaseous effluent carried from the last catalytic reactor no longer contained free oxygen and had a temperature of 300° C. This effluent was cooled to a temperature of 135° C. in the condenser associated with the last catalytic reactor to separate out the sulfur which it contained.

The gaseous effluent issued from said condenser, which contained $H_2S$ and $SO_2$ as the only sulfur compound in molar proportions of about 2 to 1 (0.77% of $H_2S$ and 0.38% of $SO_2$ by volume) was injected at a temperature of 135° C. into that one of the two converters of the supplemental purification system which was operating in the purification mode, the other being in the regenerating mode. The time of contact of this gaseous effluent with the alumina contained in the converter in purification mode was equal to 8 seconds (VVH equal to 400 $h^{-1}$) and during this contact the $H_2S$ reacted with the $SO_2$ to form sulfur which deposited on the alumina. During this time, the converter in the regenerating mode was swept by nitrogen, exiting from the heater of the gas regenerating circuit at a temperature of 300° C., to remove the sulfur deposited on the catalyst and thereby regenerate it, and the flow of nitrogen carrying the sulfur vapor exiting from this converter was cooled to 175° C., by passage through the sulfur condenser of the regenerating circuit, to condense the sulfur therefrom, while the nitrogen flow freed of sulfur was recycled by the blower through the heater to raise the temperature of this flow to 300° C., towards the inlet of the converter in regenerating mode.

The purified gaseous effluent which exited from the reactor in the purification mode and which was evacuated by the outlet conduit of the supplemental purification system, had a temperature of 140° C. and had a total content in $H_2S$ and $SO_2$ equal only to 0.092% by volume.

The overall conversion of $H_2S$ was equal to 99%, the converted $H_2S$ being completely recovered as sulfur.

We claim:

1. A process of catalytic desulfurization of an acid reaction gas free of $SO_2$ comprising $H_2S$ and optionally a total amount of at most 3% by volume of $CS_2$ and/or COS, so that the total content, called the potential content of $H_2S$, of free $H_2S$ and of $H_2S$ theoretically available from any $CS_2$ and COS that may be present, is at most equal to 5% by volume, with the recovery of sulfur which comprises contacting said acid reaction gas and a gas free of $SO_2$ and containing free oxygen in a molar ratio of oxygen to potential $H_2S$ between 0.35 and 0.6, in the presence of a catalyst in a catalytic zone at a reaction temperature between 100° and 600° C. with a contact time between the gaseous reaction medium and the catalyst between 1 and 6 seconds, said catalyst comprising titanium dioxide and a sulfate of an alkaline-earth metal selected from the group consisting of calcium, strontium, barium and magnesium.

2. The process according to claim 1 wherein the molar ratio of $O_2$ to potential $H_2S$ is between 0.35 and 0.5.

3. A process according to claim 1 wherein the effluent from the catalytic zone is subjected, after separation of the sulfur which it may contain, to a supplemental purification treatment consisting of a regenerative process using the sulfur formation reaction between $H_2S$ and $SO_2$, carried out at temperatures between 80° C. and 160° C., in contact with a conventional Claus catalyst.

4. The process of claim 1 in which the catalyst consists of a member selected from the group consisting of titanium dioxide, titanium sulfate, and a sulfate of an alkaline earth metal selected from the group consisting of calcium, strontium, barium and magnesium.

5. The process of claim 1 wherein the reaction temperature is in the range of 180° to 350° C.

6. A process of making sulfur by catalytic desulfurization of an acid reaction gas free of $SO_2$ which comprises $H_2S$, which process comprises contacting said acid reaction gas and a gas free of $SO_2$ which gas contains free oxygen and which gas is in an amount less than the stoichiometric amount necessary for the complete oxidation of the potential $H_2S$ to $SO_2$, in the presence of a catalyst in a catalytic zone at a reaction temperature between 100 and 600 degrees C., said catalyst comprising titanium dioxide and a sulfate of an alkaline earth metal selected from the group consisting of calcium, strontium, barium and magnesium.

7. A process according to claim 6 wherein said alkaline earth sulfate present in the catalyst is calcium sulfate.

8. A process according to claim 6, wherein in addition to the titanium oxide and the alkaline earth metal sulfate the catalyst comprises up to 30% by weight of a member selected from the group consisting of silica, alumina, clays, silicates, titanium sulfate and ceramic fibers.

9. A process according to claim 6 wherein the proportion by weight of titanium oxide in the catalyst is between about 60% and about 99% by weight of the calcined catalyst.

10. The process according to claim 9 wherein the proportion by weight of titanium oxide is between 80% and 99% by weight of said calcined catalyst.

11. A process according to claim 6 wherein the proportion by weight of alkaline earth metal sulfate in the catalyst is between about 40% and 1% by weight of calcined catalyst.

12. The process according to claim 11 wherein the proportion by weight of alkaline earth metal sulfate in the catalyst is between 20% and 1% by weight of calcined catalyst.

13. A process according to claim 6 wherein the specific surface of the catalyst is between 5 and 300 $m^2/g$.

14. The process according to claim 13 wherein the specific surface of the catalyst is between 10 and 240 $m^2/g$.

15. A process according to claim 6 wherein the total porous volume of the catalyst, determined by the mercury penetration method, is between 0.05 and 0.6 $cm^3/g$.

16. The process according to claim 15 wherein the total porous volume of the catalyst is between 0.1 and 0.4 $cm^3/g$.

17. A process according to claim 6 wherein one or more desulfurization zones are present, with contact times of the gaseous reaction medium with the catalyst present in each of said zones ranges from 0.5 to 10 seconds.

18. A process according to claim 6 wherein said acid gas contains H$_2$S in a concentration of at most 15% by volume, and optionally a total quantity of at least one of CS$_2$ and COS of at most 3%.

19. The process according to claim 18 wherein the total quantity of at least one of CS$_2$ and COS is at most 1% by volume.

20. A process according to claim 6 which comprises passing acid gas having a content of potential H$_2$S above about 5% by volume
  through a plurality of catalytic zones in series, said zones comprising a first catalytic zone and a last catalytic zone, optionally separated by one or more intermediate catalytic zones, each of said zones containing a catalyst comprising titanium oxide and the sulfate of an alkaline earth metal;
  injecting into said zones, a volume of gas containing free oxygen so that the proportion of oxygen entering each of the first and intermediate catalytic zones is from 0.7 to 1.2 times approximately that which is theoretically necessary to convert into sulfur a quantity of potential H$_2$S representing from 3 to 5% by volume of the acid gas;
  adjusting the temperatures of the gases entering each of the catalytic zones to values ranging from 180° C. to 350° C.;
  maintaining in each zone a contact time of the reaction gas and catalyst of between 1 and 6 seconds;
  treating the gaseous effluent from each first and intermediate catalytic zone so as to separate, by condensation, the sulfur which it contains and directing said effluent freed of sulfur towards the inlet of the next zone, and
  adjusting the molar ratio of oxygen to potential H$_2$S at the inlet of the last catalyic zone to a value ranging from 0.35 to 1.8 and subjecting the effluent of said zone to a treatment for separating, by condensation, the sulfur which it may contain, the number of intermediate catalytic zones being such that at the inlet of the last catalytic zone the acid gas contains at most 5% by volume of potential H$_2$S.

21. A process according to claim 20 wherein the molar ratio of O$_2$ to potential H$_2$S at the inlet of the last catalytic zone has a value ranging from 0.35 to 0.5, which leads to a recovery of the potential H$_2$S substantially as sulfur.

22. A process according to claim 20 or 21 wherein the effluent from the last catalytic zone is subjected, after separation of the sulfur which it may contain, to a supplemental purification treatment.

23. A process according to claim 20 or 21 wherein the effluent from the last catalytic zone is subjected, after separation of the sulfur which it may contain, to a supplemental purification treatment consisting in a regenerative process making use of the sulfur formation reaction between H$_2$S and SO$_2$, carried out at temperatures between 80° C. and 160° C., in contact with a conventional Claus catalyst.

24. A process according to claim 20 wherein the effluent from the single catalytic zone or the last catalytic zone is subjected, after separation of the sulfur which it may contain, to a supplemental purification treatment.

25. The process according to claim 6 wherein said catalyst is calcinated.

26. The process of claim 6 wherein the free oxygen is in a molar ratio of oxygen to potential H$_2$S between from 0.35 to 0.6.

27. The process of claim 6 wherein the free oxygen is in a molar ratio of oxygen to potential H$_2$S between from 0.35 to 0.5.

28. The process of claim 6 wherein the reaction of the reaction gas and the oxygen to produce the sulfur, is an oxidation which is a direct oxidation.

29. The process of claim 6 wherein the reaction gas also comprises at most 3% by volume of CS$_2$ and/or COS.

30. The process of claim 6 wherein the total content designated as the potential content of H$_2$S, of free H$_2$S and H$_2$S theoretically available from any CS$_2$ and COS that may be present, equals at most 5% by volume.

31. The process of claim 30 wherein the total maximum content is 3% by volume.

32. The process of claim 6 wherein the reaction temperature is in the range of 180° and 500° C.

33. The process of claims 1, 26, 28 or 30 which comprises the steps of recovering essentially only sulfur.

34. The process of claim 6 in which the reaction time between the gaseous reaction gas and the catalyst is between 1 and 6 seconds.

35. The process of claim 6 in which the catalyst consists of a member selected from the group consisting of titanium dioxide, titanium sulfate, and a sulfate of an alkaline earth metal selected from the group consisting of calcium, strontium, barium and magnesium.

36. The process of claim 35 wherein the free oxygen is less than the stoichiometric amount necessary for the complete oxidation of the potential H$_2$S to SO$_2$.

37. The process of catalytic desulfurization of an acid gas comprising H$_2$, and optionally a total amount of at most 3% by volume of CS$_2$ and/or COS, so that the total content, called potential content of H$_2$S, of free H$_2$S and of H$_2$S theoretically available from any CS$_2$ and COS that may be present in the acid gas in above about 5% by volume, with the recovery of sulfur, wherein said acid gas is treated by the steps of:
  passing said acid gas through a plurality of catalytic zones in series comprising a first catalytic zone and a last catalytic zone, optionally separated by one or more intermediate catalytic zones, each of said first and intermediate zones containing said catalyst which is calcined, whereas at least the final $\frac{1}{8}$ of the catalyst used in the last catalytic zone consists of a catalyst comprising a support containing a major weight proportion of alumina, said support having a specific surface between 30 and 300 m$^2$/g and containing a quantity of a metal compound corresponding to a total quantity of metal ranging from 0.5 to 10% by weight of the calcined catalyst, the optional supplemental portion of the catalyst in the last catalytic zone being constituted of the catalyst based on oxide of titanium and sulfate of alkaline earth metal,
  injecting into each said catalytic zone, a quantity of gas containing free oxygen such that the proportion of oxygen entering each of the first and intermediate catalytic zones represents 0.7 to 1.2 times that which is theoretically necessary to convert into sulfur a quantity of potential H$_2$S representing from 3 to 5% by volume of the acid gas,
  adjusting the temperatures of the gases entering each of the catalytic zones to values ranging from 180° C. to 350° C., maintaining in each zone a contact time between reaction gases and catalyst between 1 and 6 seconds, treating the gaseous effluent from each first and intermediate catalytic zone to separate the sulfur which it contains by condensation and directing said effluent freed of sulfur toward the inlet of the next catalytic zone, adjusting the molar ratio of $O_2$ to potential $H_2S$ at the inlet of the last catalytic zone to obtain an effluent containing $H_2S$ and $SO_2$ in a molar ratio of $H_2S$ to $SO_2$ equal to about two to one, then subjecting the gaseous effluent from the last catalytic zone, after separation of the sulfur which it contains, to a regenerative purification process utilizing the sulfur forming reaction of $H_2S$ and $SO_2$ in contact with a conventional CLAUS catalyst based on alumina, at temperatures between 80° C. and 160° C., said catalyst, when it is saturated with sulfur, being regenerated by sweeping it with a gas free of free oxygen at a temperature between 200° and 400° C.

38. A process according to claim 37 wherein said catalyst support comprises alumina on which there is deposited at least one compound of a metal selected from the group consisting of Fe, Co, Ni, Cu and Zn.

39. The process according to claim 37 wherein said compound is iron sulfate.

* * * * *

UNITED STATES PATENT AND TRADEMARK OFFICE
CERTIFICATE OF CORRECTION

PATENT NO. : 4,544,534
DATED : October 1, 1985
INVENTOR(S) : Thierry Dupin and Robert Voirin It is certified that error appears in the above—identified patent and that said Letters Patent is hereby corrected as shown below:

| | |
|---|---|
| Column 2, line 47: | Change "oxhydroxides" to --oxyhydroxides--. |
| Column 5, line 64: | Change "regeneration" to --regenerative--. |
| Column 9, line 7: | Change "900 $h^{31}$ 1" to --900 $h^{-1}$--. |
| Column 16, line 35: | Change "$H_2$" to --$H_2S$--. |
| Column 16, line 39: | Change "in above" to --is above--. |

Signed and Sealed this

Twenty-fifth Day of March 1986

[SEAL]

Attest:

DONALD J. QUIGG

Attesting Officer    Commissioner of Patents and Trademarks